United States Patent [19]

Phillips

[11] 4,417,141
[45] Nov. 22, 1983

[54] OPTICAL SHAFT ANGLE ENCODER
[75] Inventor: David T. Phillips, Santa Barbara, Calif.
[73] Assignee: Electro-Craft Corporation, Hopkins, Minn.
[21] Appl. No.: 272,397
[22] Filed: Jun. 10, 1981
[51] Int. Cl.³ .............................................. G01P 3/44
[52] U.S. Cl. .................... 250/231 SE; 250/237 G; 324/163
[58] Field of Search .............. 250/231 SE, 237 G; 356/395; 340/347 P; 324/163

[56] References Cited

U.S. PATENT DOCUMENTS 3,299,420  1/1967  Grabow .......................... 340/347
3,500,449  3/1970  Lenz ............................... 250/214
4,228,396  10/1980  Palombo et al. ............... 324/163

Primary Examiner—David C. Nelms
Assistant Examiner—Darwin R. Hostetter
Attorney, Agent, or Firm—Kinney, Lange, Braddock, Westman & Fairbairn

[57] ABSTRACT

An optical shaft angle encoder which provides sensor output voltages having waveform characteristics modified for use with "multiplication type" tachometer converter circuits to provide improved servo control system performance by reducing step changes in the tachometer output voltage due to phase error and reducing tachometer output voltage ripple. The geometry of the encoder mask combination provides a non-sinusoidal sensor output voltage comprised of linear and parabolic segments having a trapezoidal derivative.

3 Claims, 8 Drawing Figures

10° PLATEAU WAVE FORM

TACHOMETER OUTPUT FOR SINUSOIDS

10° PLATEAU WAVE FORM

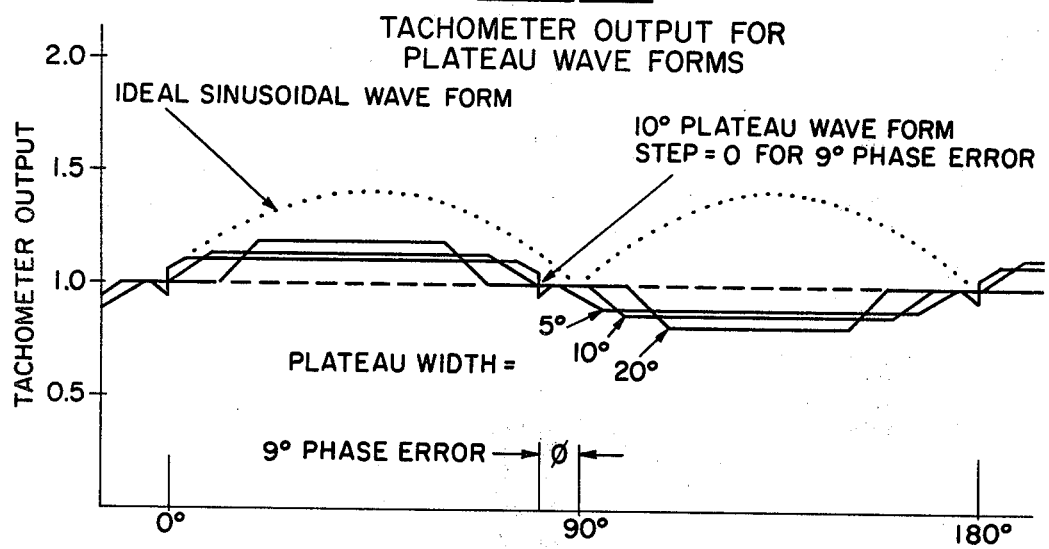
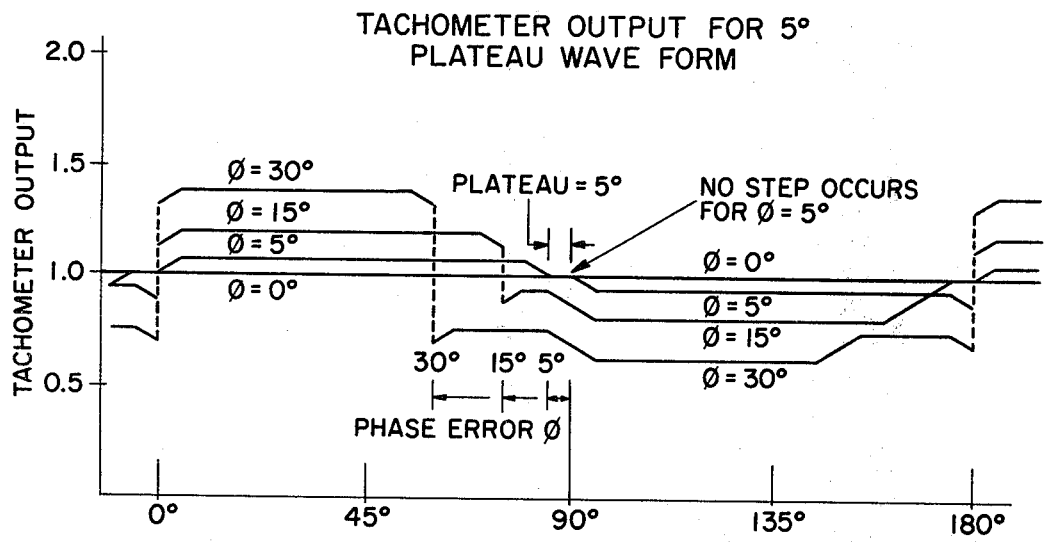

OPTICAL SHAFT ANGLE ENCODER

BACKGROUND OF THE INVENTION

1. Field of the Invention

This invention relates to the field of rotation control systems and particularly to optical shaft angle encoders for providing information relating to the rotation of an object.

2. State of the Art

Early attempts to measure shaft rotation were accomplished in 1840 by the Wheatstone Dial Telegraph, which utilized a stepper motor to rotate a wheel engraved with the letters of the alphabet, a concept which evolved into the present daisy wheel printers.

As early as 1879, synchro designs had evolved which permitted measurement of shaft rotation with relatively high speed and accuracy. Synchros and resolvers are essentially rotating transformers having a construction similar to electrical motors. Because synchros and resolvers require an alternating current drive signal and additional electronics to convert phase shifts and their output to useful digital form, they have relatively limited applicability in modern, miniature control systems.

In order to develop encoders for converting angular or linear position to numbers utilizable by a computer, a number of approaches have been developed. Magnetic encoders have been built by applying a pattern to magnetic materials or by recording techniques.

Optical encoders have, during the last twenty years, developed into the most widely used encoding device. The optical encoder uses a precise pattern applied to a transparent material to interrupt light falling on an optical sensor. A two-inch diameter encoder can typically produce from 200 to 2,000 pulses per revolution. The light source utilized is commonly a light-emitting diode or a small tungsten lamp. The sensors are commonly phototransistors, silicon photodiodes or PIN diodes.

Incremental encoders used in motion control usually provide two output signals, designated hereafter A and B, phased in the same way as sine and cosine. When both of the signals are utilized, the direction of rotation of the encoder can be derived utilizing well-known circuitry. To obtain increased resolution, both rising and falling edges of both A and B signals are often used. If the A and B signals are exactly 90° apart in phase and perfectly symmetrical, the resulting four pulses per cycle will be evenly spaced. If the phase separation between A and B is not 90°, then the spacing between the pulses will not be uniform. When the sensors are arranged circumferentially around a single data track, any slight eccentricity of the code disk motion will produce a periodic error in the phase between A and B. This problem can be greatly reduced by arranging the sensors along a radial line, as shown for example in U.S. Pat. No. 4,074,071, since both A and B signals are then affected equally by disk eccentricity. A modular encoder produced in this manner can maintain 90° plus or minus 9° phase between A and B over a broad temperature and frequency band.

Another use of the analog encoder signal is for velocity measurement. An analog signal proportional to velocity is commonly used to control motor speed in digital position control systems. This signal is often generated by a separate tachometer-generator attached to the motor shaft. The tachometer-generator adds cost, shaft inertia, length and potential service costs to the system. Thus, a convenient and economical method of using the velocity information present in the encoder analog signal has been found to be desirable. Integrated circuit motion control systems for daisy wheel printers have now been developed to provide encoder and tachometer information.

In the circuits for obtaining tachometer information from optical encoders, velocity signals are obtained by differentiating the analog encoder signal with a capacitor coupled feedback amplifier. When this arrangement is utilized with sinusoidal signals derived from the encoder, the ripple is about plus or minus 20%, even when the A and B signals are exactly phased. When the A and B signals have a phase error, a step change in tachometer output also occurs. The step changes in the tachometer output insert very high frequency components into the system, even at low angular velocities, which may excite oscillatory motion in the servo control system.

SUMMARY OF THE INVENTION

It is, therefore, an object of this invention to provide an optical encoder that can be used with an integrated circuit motion control system module to provide a tachometer output signal having low ripple and minimal step changes in tachometer output due to phase error.

It is a more specific object of this invention to provide an analog encoder which produces a non-sinusoidal modified encoder waveform to reduce ripple and remove tachometer output signal step changes due to the presence of phase errors having a magnitude below a predetermined phase angle.

In accordance with these and other objects of the invention, there is provided in an optical encoder having an illumination source, rotor means having a pattern of transparent and opaque segments thereon, detector means operatively coupled to receive signals passed through said rotor means from said illumination means producing an output signal proportional to the illumination received thereon, the improvement comprising mask means interposed between said illumination means and said detector means and constructed and arranged to cooperate with said rotor means for producing an output waveform from said detector comprised of linear and parabolic segments having a trapezoidal derivative.

BRIEF DESCRIPTION OF THE DRAWINGS

These and other objects and advantages of the present invention will become more apparent by referring to the following detailed description and accompanying drawings, in which:

FIG. 6 shows a plot of the tachometer output voltage for A and B waveforms having varying plateau widths;

FIG. 7 is a plot of tachometer output for a 5° plateau width waveform shown for varying phase error conditions.

DETAILED DESCRIPTION OF THE INVENTION

Figure 1:
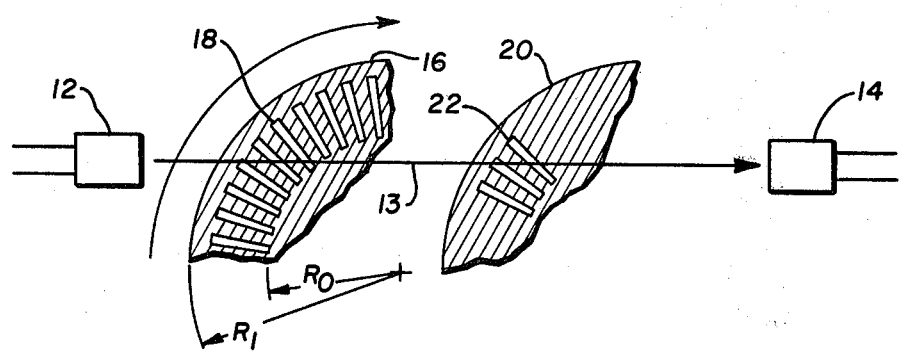
FIG. 1 is a simplified plan view showing the elements of a typical analog encoder in simplified and fragmentary form.

In FIG. 1, a schematic diagram of the elements in an optical encoder is shown. An illumination source 12 projects a beam of light 13 to a detector 14. The light passes through a movable rotor 16 rotated with the shaft of the encoder. The surface of the rotor 16 has a band of alternating opaque and transparent segments or slots 18 about its circumference. The rotor 16 and mask 20 are shown in fragmentary form only. The alternating segments are normally equal in width in order to optimize the optical exposure and achieve symmetrical output signals.

The inclusion of a stationary mask or stator 20 with transparent slits 22 corresponding to that of the rotor disk 16 is determined by the size of the photosensitive device's field of view in relation to the sector width. For low resolution encoders, a stator is not necessary, but for fine or high resolution encoders, a multiple slit stator is normally used to maximize reception of the shuttered light on the sensor.

In prior art encoders, the stator slits correspond in shape to the rotor slits. For example, in FIG. 1, the slits 22 and the mask 20 correspond to the slits 18 in the rotor 16. The slits begin at the inner-radius R0 and project to a larger radius R1 and have sides which are rays emanating from the center of the circular disk or the mask. In such a system, the detected signal at the output detector 14 is triangular becoming sinusoidal in high count encoders. In common systems, two separate tracks shifted 90° from each other are used to produce the two sinusoidal waveforms. For more accurate systems, four tracks shifted 90° from each other are utilized to produce combined output signals which are also sinusoidal.

Figure 2:
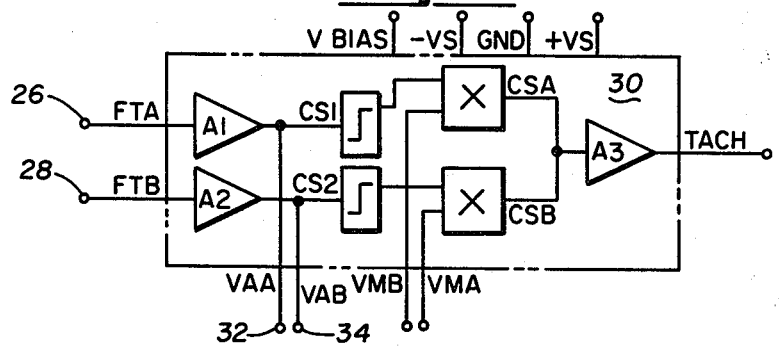
FIG. 2 is a functional block diagram of an electronic circuit chip utilizable with an analog encoder to produce position and velocity information.
Figure 3:
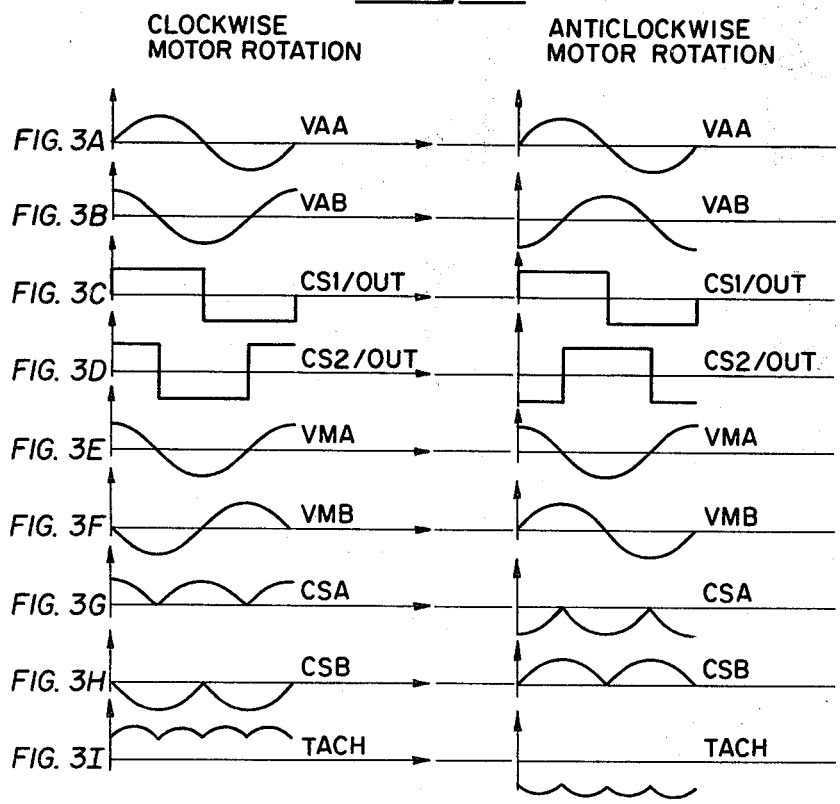
FIGS. 3A, 3B, 3C, 3D, 3E, 3F, 3G 3H and 3I illustrate waveforms relating to the electronic circuitry of FIG. 2.

FIG. 2 is a simplified block diagram for a tachometer conversion module for use in an integrated circuit motion control system for a daisy wheel printer or similar application. Such circuits are being manufactured by the SGS-Ates group of companies as an L-290 linear integrated circuit tachometer converter. A and B signals from optical encoder sensors, such as 14, are applied as inputs to terminals 26 and 28 of the circuit 30. These signals are amplified by amplifiers A1 and A2, producing output signals VAA and VAB at terminals 32 and 34, respectively. The signals are shown in diagramatic form in FIGS. 3A and 3B. The VAA and VAB signals are then converted to square waves by circuitry in module 30 and multiplied with signals VMA, shown in FIG. 3E, and VMB, shown in FIG. 3F, to produce CSA and CSB signals, as shown in FIGS. 3G and 3H, respectively. Those signals are then summed in amplifier A3 to provide a tachometer output signal, as shown in FIG. 3I.

The algorithm utilized in the L-290 circuit, shown in FIG. 2, is a simplification of an exact algorithm which assumes that the signals from the encoder are exactly A=COS (wt) and B=SIN (wt). By application of the trigonometric identity $SIN^2(\theta) + COS^2(\theta) = 1$, the tachometer output signal can be expressed as follows:

$$\text{Tachometer Output} = A\frac{dB}{dt} - B\frac{dA}{dt}$$
$$= COS\ (wt)\ COS\ (wt)\ w\ +$$
$$SIN\ (wt)\ SIN\ (wt)\ w$$
$$= w$$

The L-290 circuit simplifies the method even further by using the squaring circuits to replace the A and B signals by plus or minus 1 in the multiplication, as set forth below:

$$\text{Tachometer Output} = \text{Sign}\ (A)\frac{dB}{dt} - \text{Sign}\ (B)\frac{dA}{dt}$$

The resultant tachometer output signal, as shown in FIG. 3K, has the proper sign and linear average value, but includes ripple of ±20%, even when the A and B signals are exactly phased.

Figure 4:
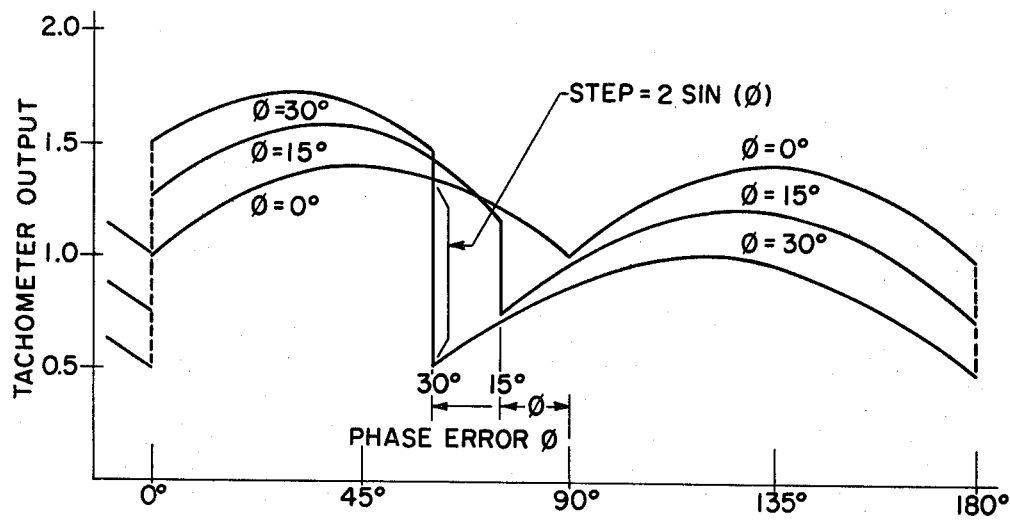
FIG. 4 is a plot showing the tachometer output of FIG. 3K for varying phase errors between the A and B signals.

FIG. 4 shows, in enlarged form, the tachometer output signal of FIG. 3K for phase errors of 0°, 15° and 30°. As illustrated clearly in FIG. 4, use of the simplified "multiplication type" algorithm in commercially available integrated circuits with state of the art sinusoidal encoder waveforms leads to undesirable ripple and sudden steps in the tachometer output voltage which have very high frequency components, even at low angular velocity. The sudden steps excite oscillatory motion in many servo control systems.

Figure 5:
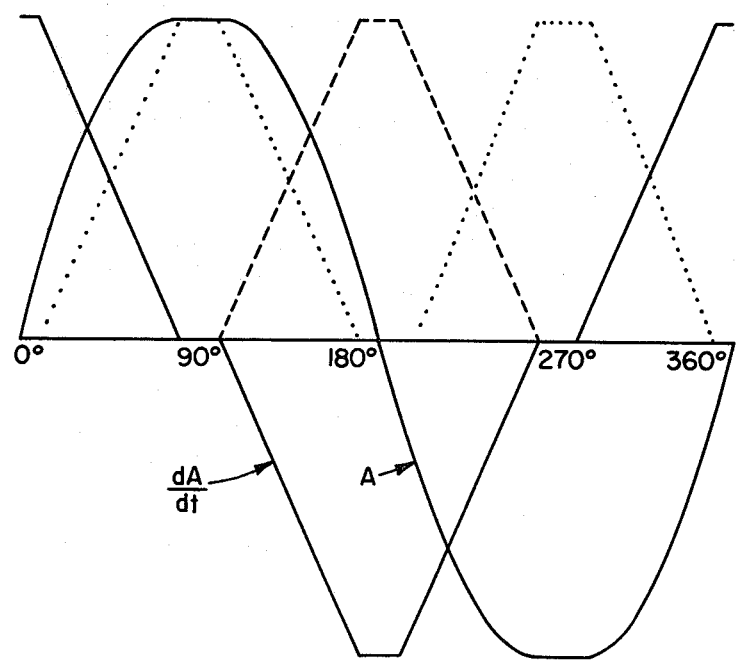
FIG. 5 shows, in simplified form, a modified A signal and its derivative for an arbitrary 10° plateau.

FIG. 5 shows a modified encoder waveform which has been found to reduce ripple and remove steps in the tachometer output for limited phase errors. In FIG. 5, the modified A signal, which has a plateau portion in the vicinity of 90° and 270°. FIG. 5 includes a plot of the derivative of the A signal. The derivative has a value of zero in the vicinity of the two plateau regions and a linear slope in the other regions. In other words, the shape of the A waveform throughout the transition between the two plateau regions is parabolic. The shape of its derivative is trapezoidal. Using the simplified multiplication algorithm, it can be seen that the A and B derivatives are either constant or zero, so that for zero phase error, ripple is eliminated.

FIG. 6 is a comparison of the tachometer output waveform for plateau waveforms having varying plateau widths. Also shown in FIG. 6, in dotted form, is the pattern for an ideal sinusoidal waveform. It can be seen that for all of the plateau widths and for varying phase errors, the amount of ripple in the tachometer output is substantially reduced from that encountered with an ideal sinusoidal waveform.

In FIG. 7, the sensitivity of the tachometer output for 5° plateau waveforms is shown. When the phase error substantially exceeds the plateau width, the tachometer output has the step change between two relatively flat portions. When the phase error is equal to or less than the plateau, the step is eliminated.

Figure 8:
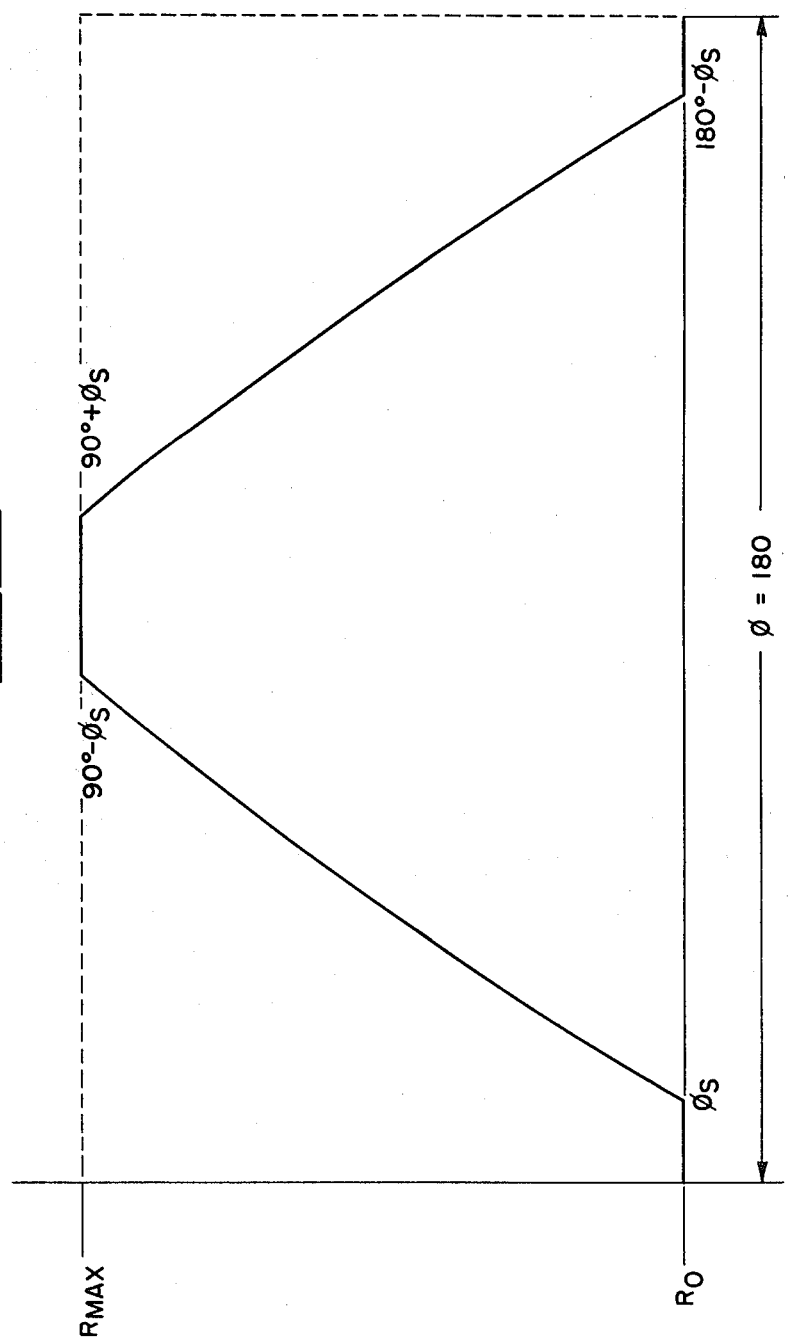
FIG. 8 is an enlarged view of a slot mask according to the present invention showing a prior art slot mask in phantom outline form and a slot employing a geometry according to the present invention.

FIG. 8 shows the shape of a mask according to the present invention for producing modified sensor output which can be utilized by multiplication-type tachometer circuits to produce output signals having less ripple and free of step changes due to phase errors. In phantom form, the typical mask slot outline is shown. The outline of the mask slot is selected to produce an output signal whose derivative is a straight line through the transition regions and is zero in the selected plateau regions. Thus, the mask slot shape is modified from the wedge shaped section of the prior art.

It can be readily seen that for a linear encoder and mask rather than a rotary disk encoder, the prior art rectangular slot becomes, according to the present invention, a slot having sides which slope up to the plateau areas according to a parabolic function. The derivative of the parabolic function is a straight line, and the derivative waveform is trapezoidal.

Because the shape of the slots in a rotary encoder is not rectangular, the shape of the slot for a circular disk encoder to obtain an output waveform having a derivative which is trapezoidal shape requires calculation of the slot boundaries in terms of radius and angle.

Assume that the code disk has a simple 50% ON and 50% OFF code pattern and that the wedges have sides which are rays passing through the center of the shaft. The angle of mechanical rotation is $\theta$ and the electrical angle is $\phi$, which is the angular width of the code and mask slots. $\phi$ is calculated by dividing the number of lines in the encoder pattern into the total angle, i.e. 360°.

To obtain a mask producing a signal with a trapezoidal output derivative, the derivative is as follows:

$$d^2 \text{Area} = r\, dr\, d\theta$$
$$= dr\, r\, d\theta$$
$$= d\theta \int_{R_o}^{R_{max}} r\, dr = d\theta\, \tfrac{1}{2}(R_{max}^2 - R_o^2)$$

at the edge of the slot:

$$a\theta w = \frac{d\text{Area}}{dt} = \frac{d\theta}{dt}\,\tfrac{1}{2}(R_{max}^2 R_o^2) = \frac{w}{2}(R_{max}^2 - R_o^2)$$

$$2a\theta = R_{max}^2 - R_o^2$$

$$R = \sqrt{R_{max}^2 + 2a\theta} = R_{max}\sqrt{1 + \frac{2a\theta}{R_o^2}}$$

In the further development of the equations for R, we define $\phi_s$ as the plateau waveform parameter in electrical degrees. Thus, the aperture or slot begins at $0+\phi_s$ and ends at $180-\phi_s$ in electrical degrees. This is represented in the plot of R versus $\phi$ in FIG. 8. Table 1 below shows the relationship between R and $\phi$ for various ranges.

TABLE 1

| For $\phi$ FROM | TO | R = |
|---|---|---|
| 0 | $\phi_s$ | $R_o$ |
| $\phi_s$ | $90 - \phi_s$ | $R_o\sqrt{1 + \dfrac{2a\phi'}{R_o^2}}$ where $\phi' = \phi - \phi_s$ |
| $90 - \phi_s$ | $90 + \phi_s$ | $R_{max}$ |
| $90 + \phi_s$ | $180 - \phi_s$ | $R_o\sqrt{1 + \dfrac{2a\phi''}{R_o^2}}$ where $\phi'' = 180 - \phi_s - \phi$ |
| $180 - \phi_s$ | $180$ | $R_o$ |

The constant a is derived by requiring R to be equal to $R_{max}$ at $\phi = 90 - \phi_s$:

$$R_{max} = R_o\sqrt{1 + \frac{2a(90 - 2\phi_s)}{R_o^2}}$$

$$R_{max}^2 = R_o^2\left(1 + \frac{2a(90 - 2\phi_s)}{R_o^2}\right)$$

$$a = \frac{R_{max}^2 - R_o^2}{2(90 - 2\phi_s)}$$

Thus, a is determined by the plateau width $\phi_s$ and the inner and outer radii $R_o$ and $R_{max}$. In somewhat simpler terms:

$$a = R_o^2\left(\frac{k^2 - 1}{2(90 - 2\phi_s)}\right)$$

where $$k = \frac{R_{max}}{R_o}$$

From the above, the calculation of the slot boundaries can be calculated for a typical encoder and the mask can be manufactured by otherwise well-known means with the modified mask.

Although the modifications of slot geometry are shown in the preferred embodiment for the mask above, it is clear that, using the teaching of my invention, changes in the rotor alone or in the slot and the rotor can be made, if desired, according to my invention as claimed below.

What is claimed is:

1. An optical encoder for providing an output signal indicative of relative motion between a scale and a frame, including illumination means and detector means mounted on a frame, said detector means constructed and arranged to receive illumination from said illumination means and producing an output signal proportional to the amount of illumination received thereon and scale means having a pattern of transparent and opaque segments thereon, said pattern interposed between said illumination means and said detector means, the improvement comprising:

mask means mounted fixedly on said frame interposed between said illumination means and said detector means, said mask means characterized by at least one transparent segment aligned with the transparent and opaque segments of said scale means, the shape of said mask means selected to transmit illumination to said detector means as relative motion is introduced between said scale means and said frame, such that the waveform of the derivative of the output signal produced by said detector means is trapezoidal.

2. A rotary optical encoder, including illumination means, detector means constructed and arranged to receive illumination from said illumination means and producing an output signal proportional to the amount of illumination received thereon and rotor means having a pattern of transparent and opaque segments thereon, said pattern interposed between said illumination means and said detector means, the improvement comprising:

mask means interposed between said illumination means and said detector means, said mask characterized by at least one transparent segment aligned with the transparent and opaque segments of said rotor means, the shape of said mask means selected to transmit illumination to said detector means as said rotor is rotated such that the waveform of the derivative of the output signal produced by said detector means is trapezoidal.

3. In a device for providing a tachometer output signal indicative of the rate of rotation of a shaft about an axis mounted on a frame, where the advice includes:

illumination means;

first and second sensors operatively coupled to the illumination means for receiving illumination therefrom and producing first and second sensor output signals having magnitudes varying in accordance with the illumination received by each of the sensors;

a code disc mounted on the shaft having at least one alternating pattern of equal width opaque and transparent segments thereon which is operatively interposed between the illumination means and the sensors for producing periodic first and second sensor signals substantially in quadrature with each other in response to rotation of the shaft; and circuit means for providing a tachometer output signal equal to the product of the first sensor output signal and the derivative of the second sensor output signal summed with the product of the second sensor output signal and the derivative of the first sensor output signal;

the improvement comprising:

mask means operatively interposed between the illumination means and the first and second sensor means, the mask means being constructed and arranged with a plurality of opaque and transparent segments for cooperation with the pattern of the code disc for providing first and second sensor output signals, each having a waveform the derivative of which is trapezoidal, the waveform having a fixed amplitude plateau portion at each zero crossing and at each maxima and minima with each of the plateau portions having the same angular displacement thereby minimizing the sensitivity of the circuit means to phase deviations of the first and second sensor output signals from quadrature and providing a relatively smooth tachometer output signal for phase deviations less than the angular displacement of the plateau portions.

* * * * *

UNITED STATES PATENT AND TRADEMARK OFFICE
CERTIFICATE OF CORRECTION

PATENT NO. : 4,417,141

DATED : November 22, 1983

INVENTOR(S) : David T. Phillips

It is certified that error appears in the above-identified patent and that said Letters Patent is hereby corrected as shown below:

Column 5, line 34, delete "$\frac{1}{2}(R^2_{max} \ R_o^2)$" and insert $$--\frac{1}{2}(R^2_{max} - R_o^2)--.$$

Column 6, line 14, delete "90" and insert --90°--.

Column 6, line 22, delete "90" and insert --90°--.

Column 7, line 14, delete "advice" and insert --device--.

Signed and Sealed this

*Thirteenth* Day of *March 1984*

[SEAL]

*Attest:*

GERALD J. MOSSINGHOFF

*Attesting Officer*     *Commissioner of Patents and Trademarks*